(12) United States Patent
Brockmann et al.

(10) Patent No.: US 10,893,313 B2
(45) Date of Patent: Jan. 12, 2021

(54) SECURE BRIDGING OF THIRD-PARTY DIGITAL RIGHTS MANAGEMENT TO LOCAL SECURITY

(71) Applicant: ACTIVEVIDEO NETWORKS, INC., San Jose, CA (US)

(72) Inventors: Ronald A. Brockmann, Utrecht (NL); Gerrit Hiddink, Utrecht (NL)

(73) Assignee: Active Video Networks, Inc., San Jose, CA (US)

( * ) Notice: Subject to any disclaimer, the term of this patent is extended or adjusted under 35 U.S.C. 154(b) by 0 days.

(21) Appl. No.: 15/261,791

(22) Filed: Sep. 9, 2016

(65) Prior Publication Data

US 2017/0078721 A1  Mar. 16, 2017

Related U.S. Application Data

(60) Provisional application No. 62/217,529, filed on Sep. 11, 2015.

(51) Int. Cl.
| | |
|---|---|
| *H04N 21/254* | (2011.01) |
| *G06F 21/10* | (2013.01) |
| *H04L 12/46* | (2006.01) |
| *H04L 29/06* | (2006.01) |
| *H04N 21/2347* | (2011.01) |
| *H04N 21/4405* | (2011.01) |

(52) U.S. Cl.
CPC ......... *H04N 21/2541* (2013.01); *G06F 21/10* (2013.01); *H04L 12/4641* (2013.01); *H04L 63/0428* (2013.01); *H04N 21/2347* (2013.01); *H04N 21/4405* (2013.01); *H04L 63/0272* (2013.01); *H04L 2463/101* (2013.01)

(58) Field of Classification Search
CPC ............ H04N 21/222; H04N 21/2343; H04N 21/2347; H04N 21/23473; H04N 21/23895; H04N 21/2541; H04N 21/26613
See application file for complete search history.

(56) References Cited

U.S. PATENT DOCUMENTS

| | | | |
|---|---|---|---|
| 7,392,378 B1 * | 6/2008 | Elliott | ................. H04L 63/0428 380/277 |
| 7,945,616 B2 | 5/2011 | Zeng et al. | |
| 8,732,854 B2 | 5/2014 | Cholas et al. | |
| (Continued) | | | |

OTHER PUBLICATIONS

ActiveVideo Networks, Inc., International Search Report and Written Opinion, PCT/US2016/051283, dated Nov. 29, 2016, 10 pgs.
(Continued)

*Primary Examiner* — Jeremy S Duffield
(74) *Attorney, Agent, or Firm* — Morgan, Lewis & Bockius LLP (57) ABSTRACT

Encrypted content from a content provider is received at a central location of a multichannel video programming distributor (MVPD). The content provider is distinct from the MVPD. The content is decrypted and processed in a virtual set-top application associated with a set-top of a customer of the MVPD. The set-top of the customer is located in a customer premises remote from the central location. The processed content is provided over a secure data link to a conditional-access encoder at the central location. The conditional-access encoder encrypts the processed content, which is then transmitted to the set-top of the customer.

16 Claims, 7 Drawing Sheets

(56) References Cited

U.S. PATENT DOCUMENTS

| | | | |
|---|---|---|---|
| 8,972,726 B1 | 3/2015 | Poling | |
| 9,313,458 B2 | 4/2016 | Helms et al. | |
| 9,418,209 B2 | 8/2016 | Mangalore et al. | |
| 2003/0126608 A1* | 7/2003 | Safadi | H04N 21/234309 725/89 |
| 2006/0129792 A1* | 6/2006 | Bots | H04L 12/46 713/1 |
| 2007/0043667 A1 | 2/2007 | Qawami et al. | |
| 2007/0192798 A1 | 8/2007 | Morgan | |
| 2008/0046373 A1* | 2/2008 | Kim | G06Q 10/00 705/51 |
| 2008/0098212 A1* | 4/2008 | Helms | H04N 21/8193 713/155 |
| 2008/0247541 A1 | 10/2008 | Cholas | |
| 2009/0007240 A1 | 1/2009 | Vantalon et al. | |
| 2009/0172726 A1* | 7/2009 | Vantalon | H04N 21/25866 725/32 |
| 2009/0265789 A1 | 10/2009 | Risan et al. | |
| 2009/0316709 A1* | 12/2009 | Polcha | H04N 21/2381 370/401 |
| 2010/0064307 A1* | 3/2010 | Malhotra | H04H 60/80 725/24 |
| 2010/0131411 A1 | 5/2010 | Jogand-Coulomb et al. | |
| 2011/0202948 A1 | 8/2011 | Bildgen et al. | |
| 2011/0299680 A1 | 12/2011 | Vembu et al. | |
| 2012/0008786 A1 | 1/2012 | Cronk et al. | |
| 2012/0030706 A1* | 2/2012 | Hulse | H04N 21/2143 725/38 |
| 2012/0050012 A1 | 3/2012 | Alsina et al. | |
| 2012/0221853 A1 | 8/2012 | Wingert et al. | |
| 2012/0257671 A1 | 10/2012 | Brockmann et al. | |
| 2013/0276015 A1* | 10/2013 | Rothschild | H04N 21/2387 725/25 |
| 2013/0305051 A1 | 11/2013 | Fu et al. | |
| 2014/0075582 A1 | 3/2014 | Hierro et al. | |
| 2014/0095890 A1 | 4/2014 | Mangalore et al. | |
| 2014/0123169 A1* | 5/2014 | Koukarine | H04N 21/2347 725/31 |
| 2014/0129825 A1 | 5/2014 | Losev et al. | |
| 2014/0157298 A1* | 6/2014 | Murphy | H04N 21/64322 725/14 |
| 2014/0215214 A1 | 7/2014 | Barnes et al. | |
| 2015/0229471 A1 | 8/2015 | Nair et al. | |
| 2016/0329080 A1 | 11/2016 | Singh et al. | |
| 2016/0364553 A1 | 12/2016 | Smith et al. | |
| 2017/0270077 A1* | 9/2017 | Morard | H04L 67/32 |

OTHER PUBLICATIONS

ActiveVideo Networks, Inc., International Search Report and Written Opinion, PCT/US2016/040547, dated Sep. 19, 2016, 6 pgs.

ActiveVideo Networks, Inc., International Preliminary Report on Patentability, PCT/US2016/040547, dated Jan. 2, 2018, 5 pgs.

ActiveVideo Networks, Inc., International Preliminary Report on Patentability, PCT/US2016/051283, dated Mar. 13, 2018, 9 pgs.

ActiveVideo Networks, Inc., Extended European Search Report, EP16818840.7, dated Nov. 30, 2018, 5 pgs.

Brockmann, Office Action, U.S. Appl. No. 15/199,503, dated Feb. 7, 2018, 12 pgs.

Brockmann, Notice of Allowance, U.S. Appl. No. 15/199,503, dated Aug. 16, 2018, 11 pgs.

Brockmann, Notice of Allowance, U.S. Appl. No. 15/199,503, dated Dec. 12, 2018, 9 pgs.

Brockmann, Office Action, U.S. Appl. No. 16/391,073, dated Aug. 22, 2019, 17 pgs.

Brockmann, Notice of Allowance, U.S. Appl. No. 16/391,073, dated Apr. 22, 2020, 9 pgs.

ActiveVideo Networks, Inc., Decision to Grant, EP16818840.7, dated Aug. 29, 2019, 2 pgs.

ActiveVideo Networks, Inc., Extended European Search Report, EP19191977.8, dated Oct. 30, 2019, 7 pgs.

ActiveVideo Networks, Inc., Intent to Grant, EP19191977.8, dated Sep. 1, 2020, 5 pgs.

ActiveVideo Networks, Inc., Extended European Search Report, EP16845261.3, dated Jan. 2, 2019, 8 pgs.

ActiveVideo Networks, Inc., Communication Pursuant to Article 94(3), EP16845261.3, dated Jun. 4, 2020, 6 pgs.

* cited by examiner

SECURE BRIDGING OF THIRD-PARTY DIGITAL RIGHTS MANAGEMENT TO LOCAL SECURITY

RELATED APPLICATIONS

This application claims priority to U.S. Provisional Patent Application No. 62/217,529, filed Sep. 11, 2015, which is incorporated by reference herein in its entirety.

TECHNICAL FIELD

The present disclosure relates generally to content-delivery systems and, more particularly, to digital-rights management (DRM) license enforcement on distributed networks.

BACKGROUND

Cable content providers and distributors have developed content-distribution services in an attempt to compete with the emerging market trend of "cord cutting", in which consumers discontinue traditional pay television subscriptions for programming delivered by multichannel video programming distributors (MVPD), such as cable and satellite TV companies or companies that perform multichannel video distribution over the Internet, in favor of accessing television content generally through online media services such as Hulu, Netflix, or YouTube. In an effort to compete with these Internet-delivered content providers, the MVPDs offer their own on-demand services to both the traditional set-top as well as to mobile devices such as tablets and smartphones. Sometimes called "TV Everywhere," such authenticated streaming and video-on-demand services from MVPDs allow these television providers (i.e., the MVPDs) to compete with Internet-delivered providers with the goal of retaining subscribers.

MVPD providers use "TV Everywhere" services to provide multiplatform access to their content on a wide variety of devices to cater to changing consumer tastes. However, the most profitable content remains the digital release, in high-definition, of feature films available to consumers on a pay-per-view or pay-per-day basis in the movie's respective digital release window. Such valuable content is considered a prime target for piracy. Content owners therefore require highly robust Digital Rights Management (DRM) content-protection safeguards to ensure that the specific consumer device requesting protected content, whether a TV set-top, Internet-connected set-top, or mobile device, is authorized to view the protected content before allowing the device to decode and play the protected content.

DRM software that is robust enough to be trusted by movie studios and other owners of high-value content is complex and computationally intensive. Examples of such software include PlayReady from Microsoft and WideVine from Google. Personal computers and tablets typically have the processing power to manage these complex security measures. Other DRM applications have been devised that will run in some smartphone environments. However, the computational power available in the typical MVPD-supplied legacy set-top box is based on old technology (e.g., a decade or two old) and incapable of running the DRM application environment required by the content owner.

A "DRM bridge" solution may be implemented in which a central server platform terminates and decodes DRM-protected content and then passes the content in the clear to an MVPD's conditional-access (CA) system, where the content is re-encrypted for further distribution on the MVPD's network. It is not a simple matter, however, for content owners to accept such a solution. Certain DRM bridge solutions have a security "gap" that occurs as the raw content is exposed between the moment it is decrypted from the approved commercial DRM system and the moment it is re-encrypted in the MVPD's CA format. This gap can allow a security breach, whether by hacking into the cable system's headend network over the Internet or possibly by an employee or ex-employee who retains access codes or has knowledge of "back doors" into the content-distribution network.

It is therefore in the interest of MVPD operators to deliver Internet-originated but protected content to their customers' televisions. The convenience of delivery of Internet content to the consumer's television (typically the consumer's largest display screen), via the cable set-top, provides an opportunity to retain customer loyalty and reduce cord-cutting.

SUMMARY

Accordingly, there is need for a centralized DRM solution that provides end-to-end encryption of media assets, from the content-delivery network (CDN) down into the client device that secures content with a robustness that is acceptable to the content owner.

Content is distributed from one or more DRM-protected systems via a distribution network to a central location (e.g., a cable TV headend or hub). One or more DRM systems in the central location are securely bridged to the content protection system of a distribution network over which the central location transmits content. The content may arrive at the central location protected by a commercial DRM typically used for Internet media distribution such as for feature films or television programming. In some embodiments, media protected by the DRM is converted to the cable television system's conditional-access (CA) system for distribution to one or more cable set-top devices ("set-tops"), which decode the content in a manner consistent with other protected content (e.g., video-on-demand (VoD) or pay-per-view (PPV) content) as distributed by the system. The translation of high-value media from one DRM system to another DRM system (e.g., the CA system) is accomplished in a secure computing environment where protected content is not exposed to potential theft.

This bridging system maintains security of all content entrusted to it via a third-party DRM-protected system, and then re-encrypts the content in the MVPD's CA format while maintaining end-to-end entertainment industry-required safeguards against piracy. The bridging system addresses the problem of securely converting commercially-valuable media from robust, third-party Digital Rights Management encryption formats widely used by Internet-based content providers to the CA protection format used by MVPDs to deliver high-value content to their paying subscribers via their respective content distribution networks.

In some embodiments, a method is performed at a central location of a MVPD. In the method, encrypted content is received from a content provider that is distinct from the MVPD. The encrypted content is decrypted and processed in a virtual set-top application associated with a set-top of a customer of the MVPD. The set-top of the customer is located in a customer premises remote from the central location. The processed content is provided over a secure data link to a conditional-access encoder and encrypted using the conditional-access encoder. The processed content as encrypted by the conditional-access encoder is transmitted to the set-top of the customer.

In some embodiments, an electronic system includes a secure application server with one or more processors and memory storing one or more programs configured to be executed by the one or more processors. The one or more programs included instructions for receiving encrypted content from a content provider, wherein the content provider is distinct from a MVPD associated with the secure application server; decrypting the encrypted content; and processing the decrypted content in a virtual set-top application associated with a set-top of a customer of the MVPD, wherein the set-top of the customer is located in a customer premises remote from the secure application server. The electronic system also includes a conditional-access encoder to encrypt the processed content for transmission to the set-top of the customer and a secure data link to convey the processed content from the secure application server to the conditional-access encoder.

In some embodiments, a non-transitory computer-readable storage medium stores one or more programs for execution by one or more processors of a secure application server at a central location of a MVPD. The one or more programs include instructions for receiving encrypted content from a content provider, wherein the content provider is distinct from the MVPD; decrypting the encrypted content; processing the decrypted content in a virtual set-top application associated with a set-top of a customer of the MVPD, wherein the set-top of the customer is located in a customer premises remote from the central location; and providing the processed content over a secure data link to a conditional-access encoder for encryption and transmission to the set-top of the customer.

The secure bridging disclosed herein provides an end-to-end secure streaming architecture in which multiple third-party vendor's DRM systems can provide protected delivery of valuable audio/video content to a common set-top device in a consumer's home. The bridging architecture provides secure storage of security-related key material in a centralized storage for the various third-party DRM credentials.

BRIEF DESCRIPTION OF THE DRAWINGS

For a better understanding of the various described embodiments, reference should be made to the Detailed Description below, in conjunction with the following drawings. Like reference numerals refer to corresponding parts throughout the figures and description.

DETAILED DESCRIPTION

Reference will now be made to certain embodiments, examples of which are illustrated in the accompanying drawings. In the following description, numerous specific details are set forth in order to provide an understanding of the various described embodiments. However, it will be apparent to those of ordinary skill in the art that the various described embodiments may be practiced without these specific details. In other instances, well-known systems, methods, procedures, components, circuits, and networks have not been described in detail to avoid unnecessarily obscuring aspects of specific embodiments.

Figure 1:
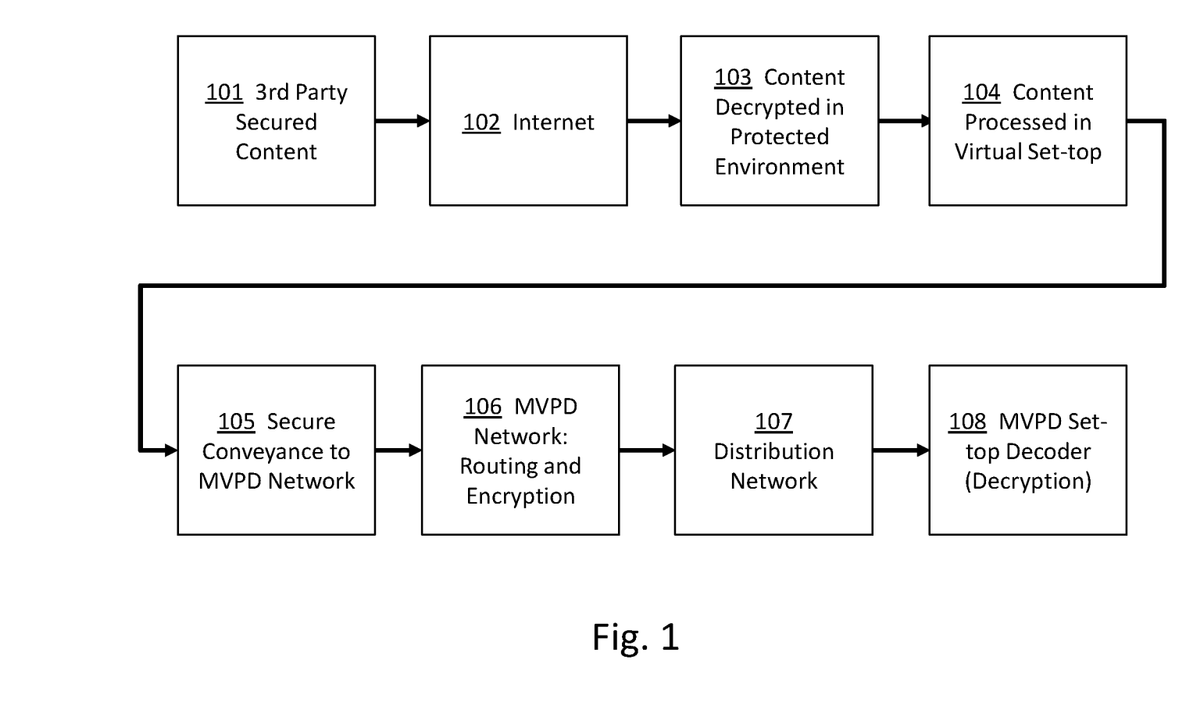
FIG. 1 is a flow diagram of steps for obtaining encrypted content via the Internet, unencrypting and processing the content, and re-encrypting the content in a network-standard encryption process for transmission to a network-compatible set-top for decrypting and display, in accordance with some embodiments.

FIG. 1 shows a flow of content in accordance with some embodiments. A third-party secure content provider 101 delivers encrypted content (e.g., including video, audio, and/or still images) via the Internet 102 to a decryption process 103 that runs in a protected environment (e.g., a secure application server). The protected environment is typically located in a processing center (e.g., headend) of a multichannel video programming distributor (MVPD), which is typically known to television consumers as their cable-TV or satellite-TV company. The content is processed in a virtual set-top application 104 (also known as a virtual set-top client or virtual set-top) in an unencrypted form (i.e., "in the clear"). Such processing may include scaling of the video image to fit in a window of a user-interface screen and/or the application of user-interface overlay graphics for such purposes as the display of a movie purchase screen or the display while viewing content of a virtual transport control process such as a simulated fast-forward, rewind, play, and pause controller. The processed content is provided to the MVPD's distribution network via a secure conveyance 105 using, for example, virtual private networking (VPN). Encryption and routing are applied to the content (e.g., to the service stream) in an MVPD network 106 in preparation for transmitting the content via the distribution network 107 to one or more receiving devices such as a set-top 108, which performs decryption and decoding.

Figure 2:
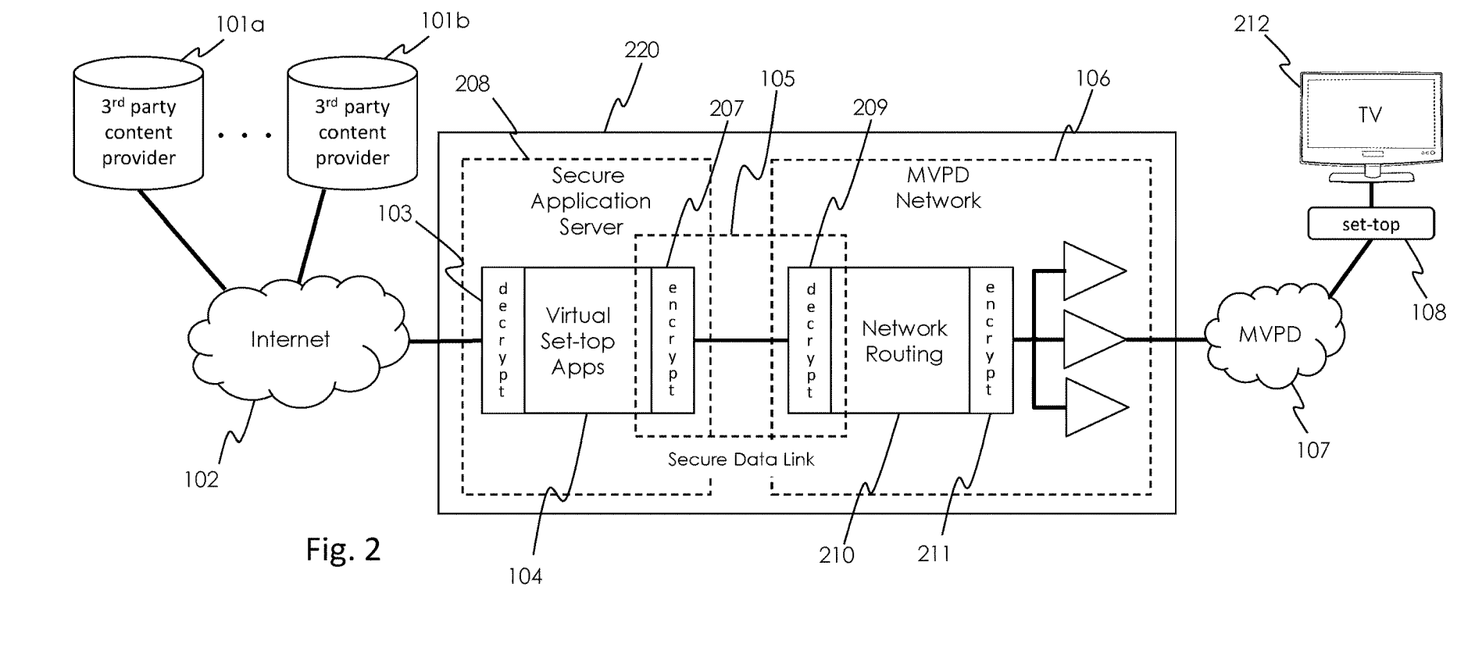
FIG. 2 is a block diagram of a system in which content flows from third-party providers through a protected environment to a television system connected to a distribution network, in accordance with some embodiments.

FIG. 2 illustrates a system with components that implement the steps of FIG. 1 in accordance with some embodiments. Third-party content providers 101a, 101b deliver encrypted content via the Internet 102 to an MVPD's central facility 220, which includes a secure application server 208 and a MVPD network 106. A decryption process 103 in the secure application server 208 decrypts the content and provides it to a virtual set-top 104, which processes the decrypted content. The secure application server 208 may have the capacity to support multiple simultaneous users (e.g., 100 or more users) and may implement (i.e., instantiate) a virtual set-top for each user.

The server 208 transmits its output to the MVPD network 106 via a secure conveyance (i.e., secure data link) 105. For example, an encryption process 207 in the secure application server 208 encrypts data output by the virtual set-top 104 and transmits the encrypted data over a communication channel to the MVPD network 106, where a decryption process 209 decrypts the data. In some embodiments, the secure data link 105 is implemented using a virtual private network (VPN) protocol (e.g., across a standard Ethernet link). Alternatively, the secure data link 105 is implemented using a dedicated link.

The MVPD network 106 performs network routing 210 and re-encodes the data using an encryption scheme 211 compatible with the set-top boxes 108 connected to the distribution network 107. The encryption scheme 211 is generally referred to as a conditional access (CA) system, which is compatible with the manufacturer of the set-tops 108 deployed by the MVPD. Examples of set-top manufacturers include Motorola (Arris) and Scientific Atlanta, among others.

Figure 3:
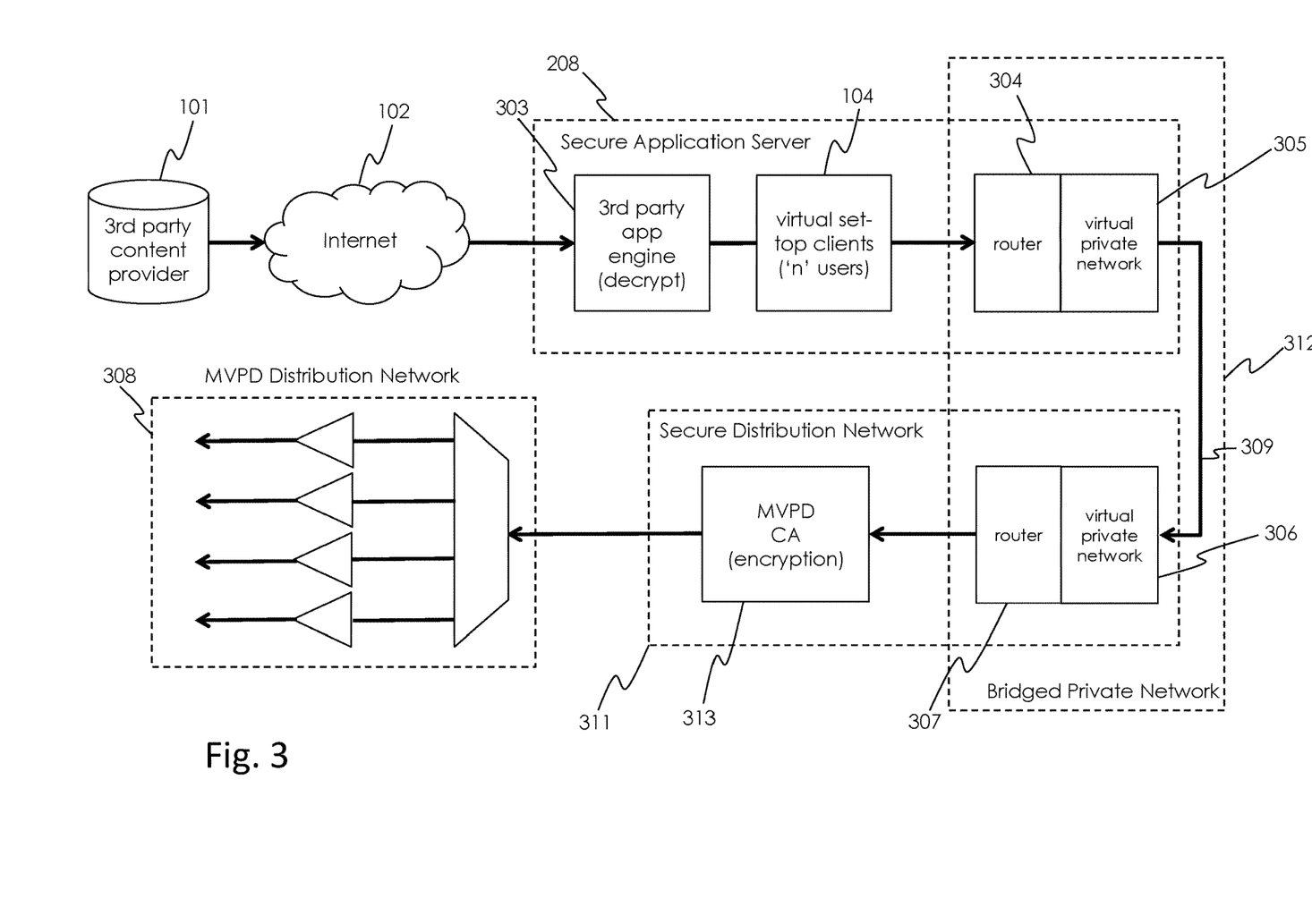
FIG. 3 is a block diagram of an example of portions of the system of FIG. 2 in accordance with some embodiments.

FIG. 3 is a block diagram showing an example of the system of FIG. 2, in accordance with some embodiments. In the example of FIG. 3, the decryption process 103 (FIGS. 1-2) is implemented with a third-party application engine 303 in the secure application server 208. The third-party application engine 303 provides secure decryption of protected media content received from a third-party content provider 101 and feeds the decrypted content to a virtual set-top 104, which provides output to a router 304. The router 304 is linked through a VPN 305 to a receiving VPN 306 via a link 309 (e.g., a wired link, such as a wired Ethernet link). Any secure communications that can convey digital media at suitable speeds could also serve as the link 309. The receiving VPN 306 provides data (e.g., digital media and other data) to a router 307, which sends the data to MVPD conditional-access encoders 313. The router 304, VPN 305, link 309, receiving VPN 306, and router 307 compose a bridged private network 312, which is an example of a secure conveyance (i.e., secure data link) 105. The MVPD CA encoders 313 implement the secure encryption scheme 211 in accordance with some embodiments. The MVPD CA encoders 313 provide encrypted data to a MVPD distribution network 308, which forwards the encrypted data to its destination. The MVPD CA encoders 313, router 307, and receiving VPN 306 compose a secure distribution network 311, which together with the MVPD distribution network 308 is an example of the MVPD network 106 (FIGS. 1-2).

Figure 4:
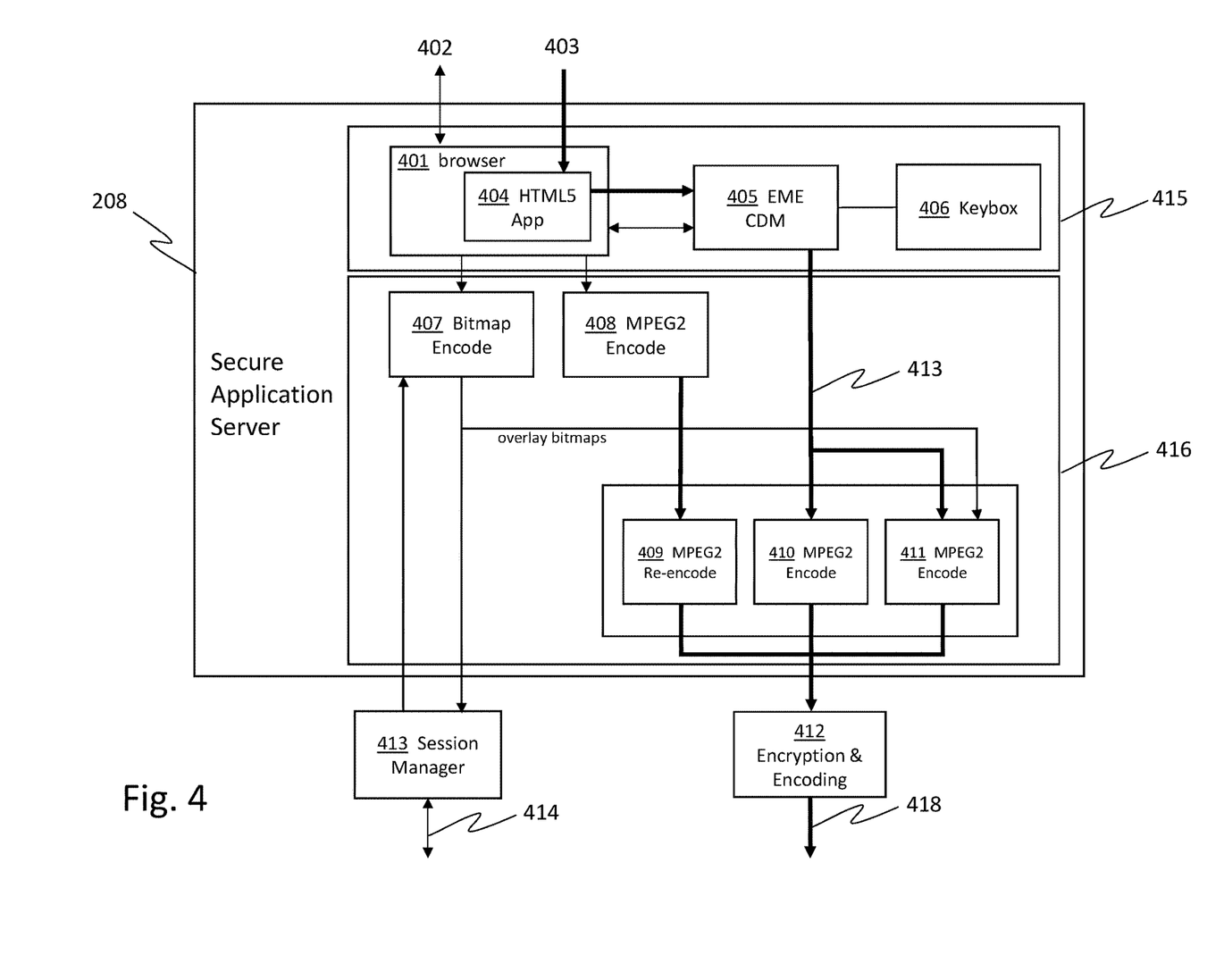
FIG. 4 is a block diagram of a secure application server and its interfaces to surrounding systems, in accordance with some embodiments.

FIG. 4 shows a content-streaming (i.e., media-streaming) architecture of the secure application server 208 in accordance with some embodiments. An embedded browser 401 (i.e., a server-side browser) (e.g., a Webkit browser, such as a Webkit-based cloud browser) in the secure application server 208 communicates with a third-party media provider 101 via a stream-control link 402 and receives a media stream 403 (i.e., a content stream, which includes video, audio, and/or images) from a content-distribution network (CDN). The embedded browser 401 executes an HTML5 application 404. (In some embodiments, the embedded browser 401 runs the third-party application engine 303, FIG. 3.) In some embodiments, the HTML5 application 404 uses open-source MediaSource or another resource that extends the HTML5 environment to allow script (e.g., JavaScript) to generate media streams for playback. Allowing JavaScript to generate streams facilitates use cases such as adaptive streaming and time-shifting live streams.

A keybox 406 stores one or more keys used to decrypt the received media stream 403. For example, a private key stored in the keybox 406 is used in conjunction with a public key held by the HTML5 application 404 to decrypt the received media stream 403. A content decryption module (CDM) 405 is used to access the keybox 406. In some embodiments, an Encrypted Media Extension (EME) API is used to allow the HTML5 application 404 to interact with the CDM 405 to decrypt the received media stream 403.

EME is an HTML5 extension that provides an API to enable web applications to interact with content-protection systems. In some embodiments, the HTML5 application 404 uses scripted routines (e.g., JavaScript software routines) to fetch the media stream 403. The HTML5 application 404 may use MPEG-DASH, HLS, or any other transport mechanism of its choice. In some embodiments, the HTML5 application 404 writes media data for the media stream 403 into a media buffer (e.g., using APIs) and monitors buffer levels to decide when there is sufficient data to start media playback.

The embedded browser 401 runs as part of a virtual set-top process 415 (e.g., virtual set-top 104) on the secure application server 208. In some embodiments, the virtual set-top process 415 supports multiple instances of virtual set-tops 104, each with a distinct corresponding instance of the HTML5 application 404 and CDM 405. The multiple instances of the CDM 405 all access a single keybox 406. In some embodiments, the embedded browser 401 (e.g., the HTML5 application 404) includes a media player that detects whether or not the media stream 403 is encrypted and, if it is encrypted, selects the proper Content Decryption Module (CDM) 405 for the corresponding digital rights management system (DRM) previously used (e.g., by the third-party content provider 101) to encrypt the media stream 403. The secure application server 208 thus may include multiple CDMs 405, each corresponding to a distinct DRM system/protocol. The CDM 405 creates a security-key request message that is transmitted to a corresponding key server associated with (e.g., operated by) a third-party content provider 101. The key server responds with the requested security key, which is stored in the keybox 406. This retrieval of the key may be referred to as a key handshake. Before the key handshake, authentication of the secure application server 208 with the third-party content provider 101 (e.g., with the content-distribution network) may be performed. If authentication and the key handshake are successful, the CDM 405 decrypts the media stream 403 and sends it to a streaming engine 416. The streaming engine 416, like the virtual set-top process 415, is executed by the secure application server 208.

In some embodiments, the streaming engine 416 switches between three modes: (1) stitching of user-interface (UI) fragments when no full-screen video is visible (e.g., available), (2) pass-through of video, or (3) transcoding of full-screen video. For example, in the first mode a first MPEG encoder 408 encodes UI fragments into a UI and provides the UI to a second MPEG encoder 409, which re-encodes the UI to scale the video in accordance with the destination set-top 108. The first mode may be performed when no full-screen video is visible. In the second mode (i.e., pass-through mode), a third MPEG encoder 410 encodes video provided (e.g., in bitmap format) by the CDM 405. The pass-through mode is selected when the corresponding set-top 108 (i.e., client device) is capable of decoding the video data (e.g., supports the relevant codec, aspect ratio, frame rate, and resolution). In the third mode, a fourth MPEG encoder 411 transcodes full-screen video (as decrypted from the media stream 403 by the CDM 405) and optionally overlays bitmaps. The bitmaps are provided by a bitmap encoder 407, which generates the bitmaps based on output from the embedded browser 401. The third mode is selected when corresponding set-top 108 (i.e., client device) is not capable of decoding the video data or when a UI overlay is to be rendered on top of the full-screen video. The access that the streaming engine 416 has to the unencrypted video data 413 allows it to blend UI overlays with the video data 413. In the second and third modes, the streaming engine 416 re-multiplexes, resynchronizes, and re-streams the original decrypted video stream 413, which is encrypted by an encryption process 412 (e.g., by the secure encryption scheme 211, FIG. 2) (e.g., in a CA encoder 313). The encryption process 412 outputs an encrypted video stream 418. The video stream 418 is an example of a content stream.

In some embodiments, if the set-top 108 (i.e., client device) at the destination supports overlay rendering with sufficient quality, the system may send the overlay bitmaps 414 to the set-top 108 rather than using hardware transcoding resources (e.g., MPEG encoder 411) on the secure application server 208. For example, the overlay bitmaps are sent to the set-top 108 in the clear (i.e., unencrypted) separately from the encrypted video stream 418.

In some embodiments, the output of the streaming engine 416 is sent as a clear (i.e., unencrypted) MPEG2 transport stream (MPEG-TS) over UDP to the MVPD network 106. The connection from the streaming engine 416 to the MVPD network 106 can be achieved, for example, via a secure virtual private network connection (e.g., in the bridged private network 312, FIG. 3) or other secure connection, such that valuable content is never transmitted "in the clear" even within the facilities (e.g., headend) of the MVPD. The MVPD network 106 encrypts the video stream (e.g., using encryption scheme 211, FIG. 2) before sending it to the set-top 108, using the MVPD's Conditional Access system (e.g., CA encoder 313, FIG. 3). In some embodiments, three models are supported for encryption by the CA system: (1) a session manager (e.g., executed by the secure application server 208) interfaces with the MVPD network 106 (e.g., using the SimulCrypt EIS-SCS protocol) to request encryption of the content stream to securely send the content stream to an authorized set-top 108 capable of decrypting the content stream; (2) the session manager interacts with a MVPD session resource manager (SRM) (e.g., executed by the secure application server 208) to request a network resource that has encryption enabled. The SRM then interacts with the CA system to enable encryption; (3) The MVPD configures common encryption on the network transmission system, ensuring that all streams on a certain network path (e.g., a path within the distribution network 107) are encrypted. The configuration in the third model is a static configuration and requires no messaging between the session manager and the MVPD network 106.

In some embodiments, the keybox 406 (FIG. 4) contains device certificates, access tokens, and/or other secrets (e.g., private keys) used by the CDM 405. Such data is treated, for example, as an unstructured data object, sometimes referred to as a 'blob'. In some embodiments, such as for the Widevine CDM, a key in the keybox 406 is provisioned in encrypted (i.e., wrapped) format and is only present in clear-text (i.e., in an unencrypted format) inside the CDM 405 itself.

Requirements for secrecy and non-mutability of these data items may be stated in so-called "robustness rules" that apply to set-top box manufacturers as well as third parties that pass or otherwise control valuable encrypted content. These rules specify whether or not it is acceptable that a data item is read, modified, or duplicated given a certain set of system tools. Content providers are justifiably concerned about unauthorized service hacks by any consumer who can obtain a set-top 108 and, hence, must be considered a potential adversary.

When moving the playback application to the cloud in accordance with embodiments disclosed herein, the application is not executed in a consumer premise (a hostile environment from a security perspective), but instead runs on an operator network environment that is considered secure in terms of protection against physical and network access from outside intruders. From this perspective, the data is considered protected against common threats. Also, consumers (i.e., end-users) are no longer considered an adversary, because it becomes difficult for them to access secret data. As such, many of the robustness rules are met by moving the data items into the protected operator network (e.g., by storing them in the keybox 406). On the other hand, the data is stored in bulk on network servers rather than on individual flash memories on many thousands of set-top boxes. This bulk storage makes it easier for an intruder, especially from an insider (e.g., an employee) to get access to bulk data and hence may result in the imposition of additional security requirements on data storage, which may not be specified in the robustness rules.

Figure 5:
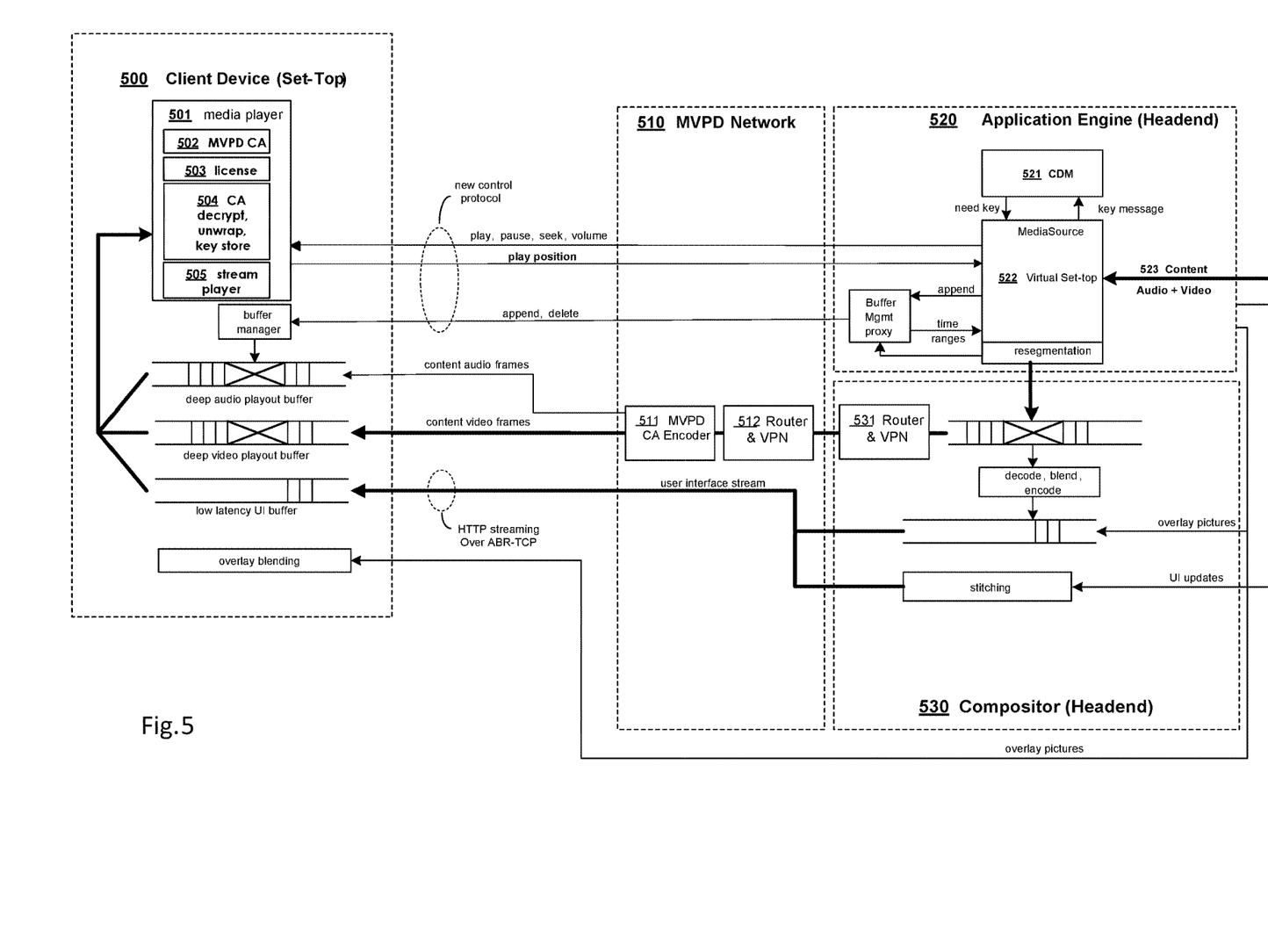
FIG. 5 is a block diagram showing content-security elements from the headend to the set-top, in accordance with some embodiments.

FIG. 5 shows content-security processes and interconnections from the headend to the set-top in accordance with some embodiments. Secure content 523 from a third-party content provider 101 arrives at an application engine 520 (e.g., as executed by a secure application server 208) and is decrypted using the CDM 521 (e.g., CDM 405, FIG. 4) by a virtual set-top 522 (e.g., virtual set-top 104). The content then passes through a secure router/VPN link 531 to router/VPN 512 in the MVPD Network 510, which feeds the content to MVPD CA encoder 511 (e.g., CA encoder 313). The CA encoder 511, which is also in the MVPD Network 510, encrypts and thus re-secures the content stream for transmission to one or more client devices 500 (e.g., set-tops 108).

A media player 501 in a client device 500 processes the received content stream. A MVPD conditional access process 502 of the media player 501 decrypts the content stream by applying a license 503 to a CA decrypt process 504. The decrypted content is presenting to a stream player 505, which decodes the content (i.e., media) and sends the decoded content to a connected display device (e.g., an HDTV monitor).

Figure 6:
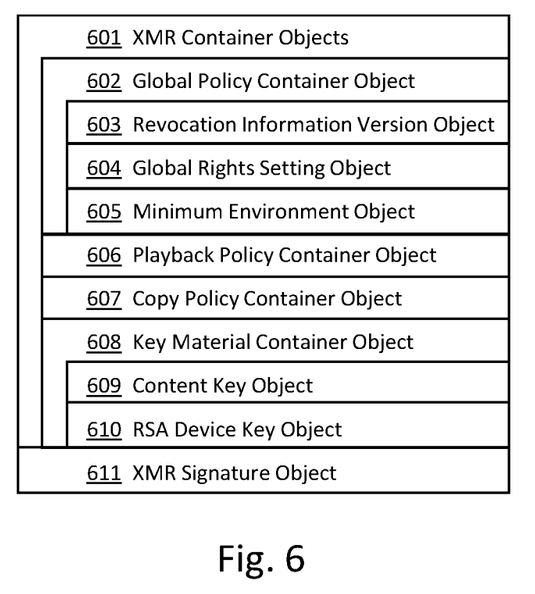
FIG. 6 shows an Extensible Media Rights (XMR) header data structure that defines a data record structure in XML format for communicating DRM information between trusted computing elements, in accordance with some embodiments.

FIG. 6 shows an Extensible Media Rights (XMR) header structure defining a data record structure 600 in XML format for communicating DRM information between trusted computing environments, in accordance with some embodiments. For example, the data record structure 600 is used for messages sent between set-tops 108 and the secure application server 208 and/or between the secure application server 208 and CDNs for third-party content providers 101. The data record structure 600 includes one or more XMR container objects 601 and an XMR signature object 611. Each XMR container object 601 includes a global policy container object 602, playback policy container object 606, copy policy container object 607, and key material container object 608. The global policy container object 602 includes a revocation information version object 603, global rights setting object 604, and minimum environment object 605. The key material container object 608 includes a content key object 609 and RSA device key object 610. An object that is not relevant to or absent from a particular message may be omitted from the message.

Disclosed embodiments provide secure and efficient online video services, such as video services that use standardized W3C technologies (e.g., HTML5, MediaSource, and Encrypted Media Extensions). Web applications may be run without modifications in accordance with some embodiments. Valuable content is securely conveyed in audio and/or video formats to set-top devices in consumer premises (e.g., the consumer's home), where a set-top with only an MVPD's general-purpose conditional-access capability can access any content from online video providers while maintaining content security.

The functionality described herein, for the server and/or the client, may be embodied in many different forms, including by way of example only but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the functionality previously described herein may be embodied in various forms, including, by way of example only but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The storage medium may be a non-transitory computer-readable storage medium (e.g., nonvolatile memory). The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server over a communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server over the communication system (e.g., the Internet or World Wide Web).

Figure 7:
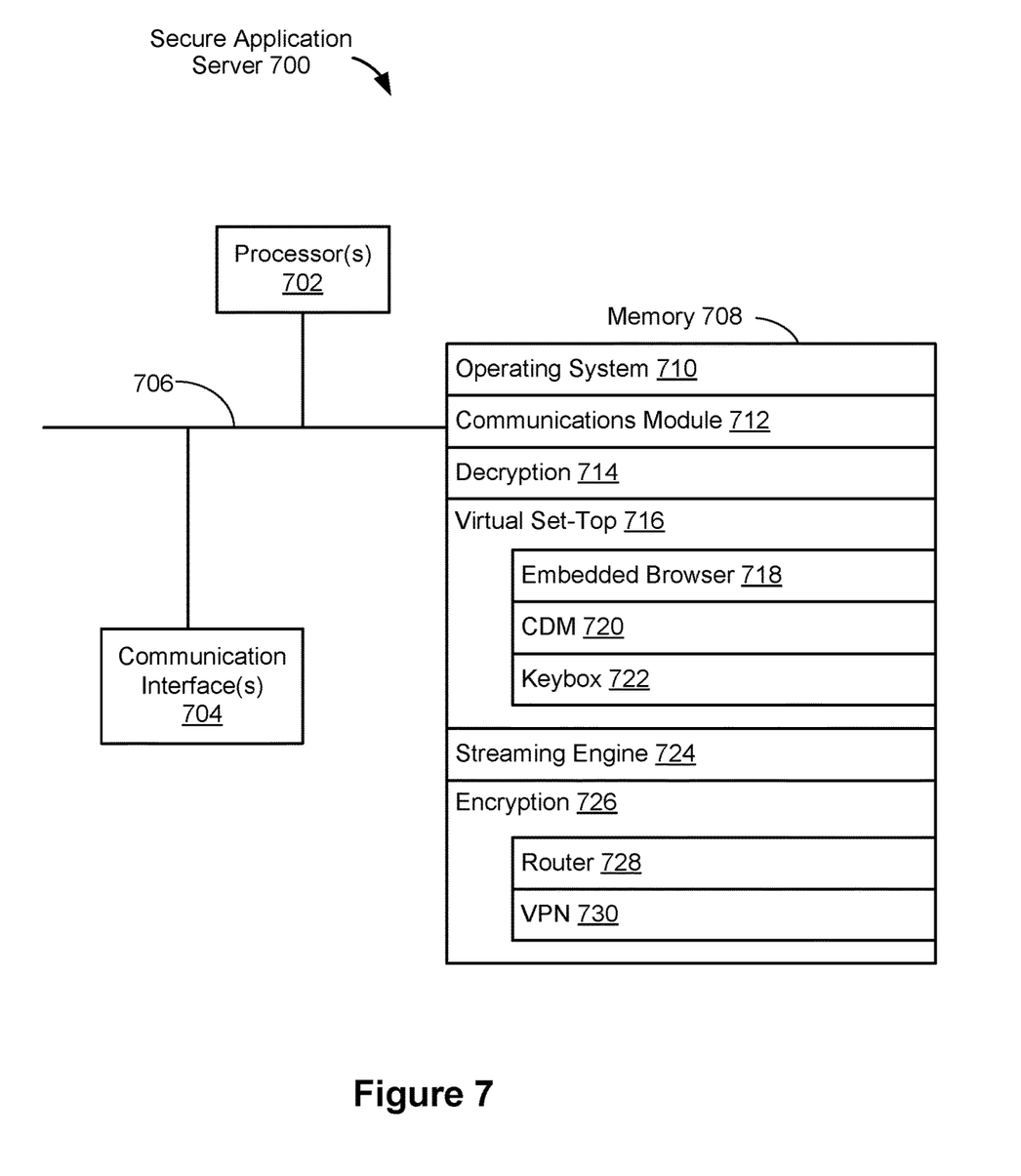
FIG. 7 is a block diagram illustrating a secure application server in accordance with some embodiments.

FIG. 7 is a block diagram illustrating a secure application server 700 (e.g., secure application server 208) in accordance with some embodiments. The secure application server 700 includes one or more processing units (processors or cores) 702, one or more network or other communications interfaces 704, memory 708, and one or more communication buses 706 for interconnecting these components. The secure application server 700 optionally includes a user interface (not shown).

Memory 708 includes volatile and non-volatile memory and may optionally include one or more storage devices remotely located from the processing units 702. Memory 708, or alternately non-volatile memory within memory 708, includes a non-transitory computer-readable storage medium. In some embodiments, memory 708 or the computer-readable storage medium of memory 708 stores the following programs, modules and data structures, or a subset or superset thereof:

- an operating system 710 that includes procedures for handling various basic system services and for performing hardware-dependent tasks;
- a network communication module 312 for connecting the secure application server 700 to other computers via the one or more communication network interfaces 304 (wired or wireless) and one or more communication networks;
- a decryption module 714 (e.g., decryption process 103/third-party application engine 303);
- a virtual set-top application 716 (e.g., virtual set-top application 104/virtual set-top process 415), including for example:
  - an embedded browser 718 (e.g., embedded browser 401),
  - a CDM 720 (e.g., CDM 405), and
  - a keybox 722 (e.g., keybox 406);
- a streaming engine 724 (e.g., streaming engine 416); and
- an encryption module 726 (e.g., encryption process 207), including for example:
  - a router 728 (e.g., router 304), and
  - a VPN 730 (e.g., VPN 305).

Each of the above identified modules, applications, and engines correspond to a set of executable instructions for performing one or more functions as described above and/or in the methods described herein. These sets of instructions need not be implemented as separate software programs, procedures or modules, and thus various subsets are, optionally, combined or otherwise re-arranged in various embodiments. In some embodiments, memory 708 stores a subset of the items identified above. Furthermore, memory 708 optionally stores additional items not described above.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

Acronym Expander Table
API—Application Programming Interface
CDN—Content Delivery Network
CDM—Content Decryption Module
DRM—Digital Rights Management
MVPD—Multichannel Video Programming Distributor
TEE—Trusted Execution Environment
VPN—Virtual Private Network
XMR—Extensible Media Rights

What is claimed is:

1. A method, comprising:
at a headend of a multichannel video programming distributor (MVPD), the headend including a virtual set-top application, an MVPD network distinct from the virtual set-top application, a first router communicatively coupled to the virtual set-top application, a conditional-access encoder, and a second router coupled to the conditional-access encoder:
at the virtual set-top application:
receiving encrypted content from a content provider, wherein the content provider is distinct from the MVPD;
decrypting the encrypted content in accordance with a first Digital Rights Management (DRM) protocol used by the content provider;
processing the decrypted content from the content provider;
encrypting data corresponding to the processed decrypted content from the content provider;
transmitting the encrypted data over a secure data link from the first router to the second router, wherein the secure data link comprises a virtual private network (VPN) implemented across an Ethernet link; and
at the second router, decrypting the encrypted data and sending the decrypted data from the second router to the conditional-access encoder;
determining whether a set-top of a customer supports user-interface overlay rendering; and
upon determining that the set-top of the customer does not support user-interface overlay rendering:
encrypting, via the conditional-access encoder, the decrypted data and at least one user-interface overlay using a second DRM protocol compatible with the set-top of the customer, wherein the second DRM protocol is distinct from the first DRM protocol; and
transmitting the data and the at least one user-interface overlay, as encrypted by the conditional-access encoder, to the set-top of the customer; and
upon determining that the set-top of the customer does support user-interface overlay rendering:
encrypting, via the conditional-access encoder, the decrypted data using the second DRM protocol compatible with the set-top of the customer; and
transmitting, to the set-top of the customer (i) the data as encrypted by the conditional-access encoder, and (ii) the at least one user-interface overlay that has not been encrypted using the second DRM protocol.

2. The method of claim 1, wherein:
receiving the encrypted content, decrypting the encrypted content, and processing the decrypted content are performed in a secure application server at a central location.

3. The method of claim 2, wherein decrypting the encrypted content is performed using a key from a secure keybox in the secure application server.

4. The method of claim 1, wherein receiving the encrypted content from the content provider comprises receiving the encrypted content from a content-distribution network associated with the content provider.

5. The method of claim 4, wherein the encrypted content is received from the content-distribution network via the Internet.

6. The method of claim 1, wherein:
the encrypted content comprises encrypted video; and
processing the decrypted content comprises scaling the video to fit a window of a screen.

7. The method of claim 1, wherein:
the encrypted content comprises encrypted video; and
processing the decrypted content comprises overlaying user-interface graphics on the video.

8. The method of claim 1, wherein the MVPD is a cable-TV company or a satellite-TV company.

9. The method of claim 1, wherein the headend of the MVPD distributes the processed content as encrypted by the conditional-access encoder via the Internet.

10. The method of claim 1, wherein the encrypted content comprises encrypted audio.

11. The method of claim 1, wherein the encrypted content comprises an encrypted image.

12. An electronic system, comprising:
a secure application server of a multichannel video programming distributor (MVPD), including a virtual set-top application, an MVPD network distinct from the virtual set-top application, a first router communicatively coupled to the virtual set-top application, a conditional-access encoder, and a second router coupled to the conditional-access encoder, comprising one or more processors and memory storing one or more programs configured to be executed by the one or more processors, the one or more programs including instructions for:
receiving encrypted content from a content provider, wherein the content provider is distinct from the MVPD;
decrypting the encrypted content in accordance with a first Digital Rights Management (DRM) protocol used by the content provider;
processing the decrypted content from the content provider;
encrypting data corresponding to the processed decrypted content from the content provider;
transmitting the encrypted data over a secure data link from the first router to the second router, wherein the secure data link comprises a virtual private network (VPN) implemented across an Ethernet link;
at the second router, decrypting the encrypted data and sending the decrypted data from the second router to the conditional-access encoder; and
determining whether a set-top of a customer supports user-interface overlay rendering; and
upon determining that the set-top of the customer does not support user-interface overlay rendering:
encrypting, via the conditional-access encoder, the decrypted data and at least one user-interface overlay using a second DRM protocol compatible with the set-top of the customer, wherein the second DRM protocol is distinct from the first DRM protocol; and
transmitting the data and the at least one user-interface overlay, as encrypted by the conditional-access encoder, to the set-top of the customer; and
upon determining that the set-top of the customer does support user-interface overlay rendering:
encrypting, via the conditional-access encoder, the decrypted data using the second DRM protocol compatible with the set-top of the customer; and
transmitting to the set-top of the customer (i) the data as encrypted by the conditional-access encoder, and (ii) the at least one user-interface overlay that has not been encrypted using the second DRM protocol.

13. A non-transitory computer-readable storage medium storing one or more programs for execution by one or more processors at a headend of a multichannel video programming distributor (MVPD), the headend including a virtual set-top application, an MVPD network distinct from the virtual set-top application, a first router communicatively coupled to the virtual set-top application, a conditional-access encoder, and a second router coupled to the conditional-access encoder, the one or more programs including instructions for:
at the virtual set-top application:
receiving encrypted content from a content provider, wherein the content provider is distinct from the MVPD;
decrypting the encrypted content in accordance with a first Digital Rights Management (DRM) protocol used by the content provider;
processing the decrypted content from the content provider;
encrypting data corresponding to the processed decrypted content from the content provider;
transmitting the encrypted data over a secure data link from the first router to the second router, wherein the secure data link comprises a virtual private network (VPN) implemented across an Ethernet link;
at the second router, decrypting the encrypted data and sending the decrypted data from the second router to the conditional-access encoder;
determining whether a set-top of a customer supports user-interface overlay rendering; and
upon determining that the set-top of the customer does not support user-interface overlay rendering:
encrypting, via the conditional-access encoder, the decrypted data and at least one user-interface overlay using a second DRM protocol compatible with the set-top of the customer, wherein the second DRM protocol is distinct from the first DRM protocol;
transmitting the data and the at least one user-interface overlay, as encrypted by the conditional-access encoder, to the set-top of the customer; and
upon determining that the set-top of the customer does support user-interface overlay rendering:
encrypting, via the conditional-access encoder, the decrypted data using the second DRM protocol compatible with the set-top of the customer; and
transmitting, to the set-top of the customer (i) the data as encrypted by the conditional-access encoder, and (ii) the at least one user-interface overlay that has not been encrypted using the second DRM protocol.

14. The method of claim 1, wherein:
the virtual set-top application is executed by a secure application server.

15. The method of claim 1, wherein the headend of the MVPD comprises a headend of a cable TV provider.

16. The method of claim 1, further comprising:
at a first instance of the virtual set-top application, determining that a first set-top of a first customer supports user-interface overlay rendering;
upon determining that the first set-top of the first customer does not support user-interface overlay rendering:
encrypting, via the conditional-access encoder, the decrypted data and the at least one user-interface overlay using the second DRM protocol compatible with the first set-top of the customer, wherein the second DRM protocol is distinct from the first DRM protocol; and
transmitting the encrypted content and the at least one user-interface overlay, as encrypted by the conditional-access encoder, to the first set-top of the first customer; and
at a second instance of the virtual set-top application, determining that a second set-top of a second customer supports user-interface overlay rendering;
upon determining that the second set-top of the second customer does support user-interface overlay rendering:
encrypting, via the conditional-access encoder, the decrypted and processed content using the second DRM protocol compatible with the second set-top of the second customer; and
transmitting, to the second set-top of the second customer (i) the encrypted content as encrypted by the conditional-access encoder, and (ii) the at least one user-interface overlay that has not been encrypted using the second DRM protocol.

* * * * *